Dec. 11, 1962  J. D. HOGDEN ETAL  3,067,651
PIPE CUTTER

Filed March 4, 1960  4 Sheets-Sheet 1

INVENTORS.
JOHN D. HOGDEN,
JOE B. LOVETT,
BY Frank S. Troidl
ATTORNEY.

Dec. 11, 1962     J. D. HOGDEN ETAL     3,067,651

PIPE CUTTER

Filed March 4, 1960                                     4 Sheets-Sheet 2

*INVENTORS.*
JOHN D. HOGDEN,
JOE B. LOVETT,
BY *Frank S. Triodl*

ATTORNEY.

Dec. 11, 1962 J. D. HOGDEN ETAL 3,067,651
PIPE CUTTER

Filed March 4, 1960 4 Sheets-Sheet 3

INVENTORS.
JOHN D. HOGDEN,
JOE B. LOVETT,
BY
Frank S. Troidl
ATTORNEY.

Dec. 11, 1962    J. D. HOGDEN ETAL    3,067,651
PIPE CUTTER

Filed March 4, 1960    4 Sheets-Sheet 4

INVENTORS.
JOHN D. HOGDEN,
JOE B. LOVETT,
BY Frank S. Troidl
ATTORNEY.

3,067,651
PIPE CUTTER
John D. Hogden, 802 Ave. A, P.O. Box 381, and Joe B. Lovett, 506 Ave. A, P.O. Box 305, both of Sweeny, Tex.
Filed Mar. 4, 1960, Ser. No. 12,760
6 Claims. (Cl. 90—12)

This invention relates to machines for cutting pipe. More particularly, this invention relates to machines for cutting bevels on the edge of a pipe.

The usual method of cutting bevels of any degree or shape on a pipe is to mount the pipe on a lathe and form the bevel. If it is desired to provide a pipeline for the transportation of various fluids in the field, the pipe must be beveled in the workshop on a lathe and then transported to the field where the pipe sections are welded together. Obviously, a portable machine which is light in weight and which can be used in the field and shops to machine bevels of any degree or shape on pipe is highly desirable.

The pipe cutter to be described herein provides a portable machine which is light in weight and can be used in the field or the shops to machine the required bevels on pipe and also machine a perfectly square joint to facilitate the alignment of the joint to be welded.

The invention as well as its many advantages will be further understood by reference to the following detailed description and drawings in which.

Figure 1:
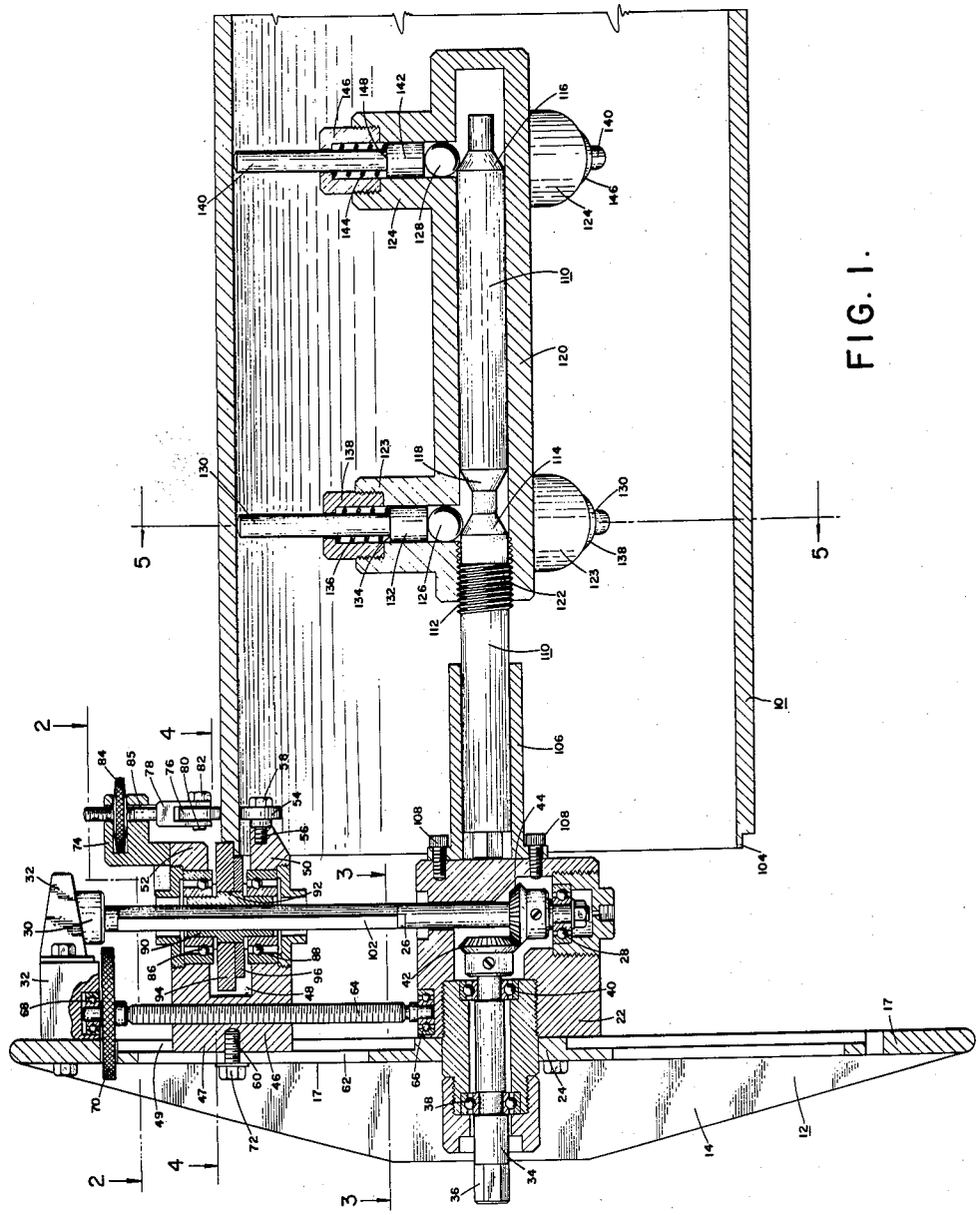
FIG. 1 is an elevational view partly in section showing the machine and its component parts in position to form the bevel on the edge of a pipe.
Figure 6:
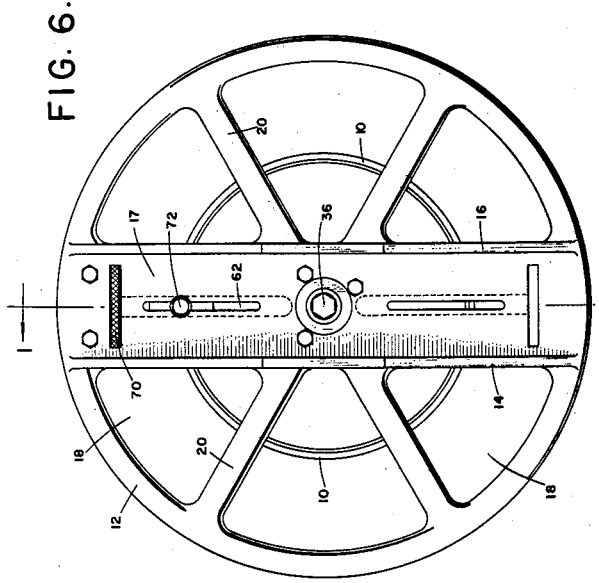
FIG. 6 is a top plan view at one-half the scale of FIG. 1 showing the frame of the machine.

Referring to the drawings and particularly to FIG. 1 and FIG. 6, a pipe 10 is shown in position for the cutting of the bevel of desired shape on the top edge of the pipe. The machine includes a frame 12 having spaced-apart vertically extending braces 14 and 16 and a transverse plate 17 (see FIG. 6). As shown in FIG. 1 and FIG. 6, frame 12 may be generally circular in shape. The frame 12 may be provided with cut-out portions 18 forming radial spokes 20. This provides for a light and easily handled portable machine.

Referring again to FIG. 1, a drive housing 22 is shown bolted to the hub 24 of the frame 12. The drive housing 22 extends below the frame 12.

A rotatable shaft 26 has its inner end mounted within the drive housing 22 and rotates within bearing 28. Rotatable shaft 26 extends outwardly from the drive housing 22 in a plane substantially parallel to the plane of the frame 12. The outer end of shaft 26 is mounted for rotational movement in shaft bearing 30. The shaft bearing 30 is supported by a pillar block bearing 32 which is bolted to the outer edge of the frame 12 and extends downwardly therefrom.

A power driven rotatable shaft 34 is mounted centrally within the frame 12 and extends above and below the frame 12. The upper end of the power driven shaft 34 is provided with a hexagonal shaped shaft 36. An adaptor (not shown) can be screwed directly on the hexagonal end 36 of the shaft 34. The adaptor can be connected directly to a source of power, either electrical or pneumatic, such as any ½-inch drill motor. The power driven shaft 34 is supported by two spaced-apart combination thrust and radial bearings 38 and 40. A miter gear 42 is screwed upon the lower end of power driven shaft 34. The miter gear 42 engages a second miter gear 44 screwed upon the shaft 26. Thus, it is apparent that when power is applied to the power driven shaft 34, the rotatable shaft 26 which is operatively interconnected to the power driven shaft 34 by means of gears 42 and 44 is rotated at high speed.

An adjustable bearing block 46 extends downwardly from the frame 12. The adjustable bearing block 46 is provided with a slot 48 which extends upwardly from the bottom thereof to form an inner downwardly extending portion 50 and an outer downwardly extending portion 52. An inner roller bearing wheel 54 is bolted by means of bolt 56 and nut 58 to the lower extremity of the inner member 50.

A bolt 60 extends through a slot 62 formed in the transverse plate 17 of the frame 12. Bolt 60 is screwed into the upper portion of the bearing block 46. A threaded screw 64 extends transversely through the bearing block 46 and has its inner end mounted for rotational movement within bearing 66 mounted in drive housing 22 and its outer end mounted for rotational movement within bearing 68 mounted within pillar block bearing 32. Radial adjustment of the bearing block 46 may be accomplished by rotation of a knurled wheel 70 mounted about the outer end of the threaded screw 64. Upon rotation of wheel 70, the dovetail 47 of block 46 slides within groove 49 formed in plate 17. The bearing block 46 is locked in the desired radial position by tightening of the nut 72 on bolt 60.

An outer roller bearing wheel support 74 extends outwardly from the portion 52 of bearing block 46. An outer roller bearing wheel 76 is mounted within a U-shaped portion of a threaded member 78 by means of bolt 80 and nut 82. A knurled wheel 84 is mounted about the threaded portion of the threaded member 78 and rotates within a slot provided in member 74. Thus, the adjustable roller bearing wheel 76 may be adjusted to contact the outer perimeter of the pipe 10 by rotation of knurled wheel 84. A key 85 keeps wheel 76 horizontal during adjustment of the position of wheel 76.

Figure 4:
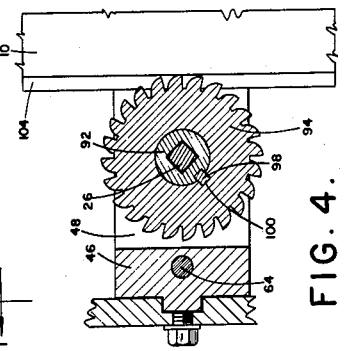
FIG. 4 is a view taken along lines 4—4 of FIG. 1.
Figure 3:
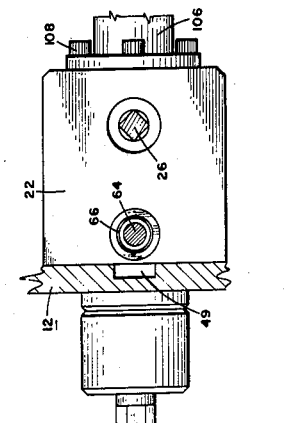
FIG. 3 is a view taken along lines 3—3 of FIG. 1.
Figure 5:
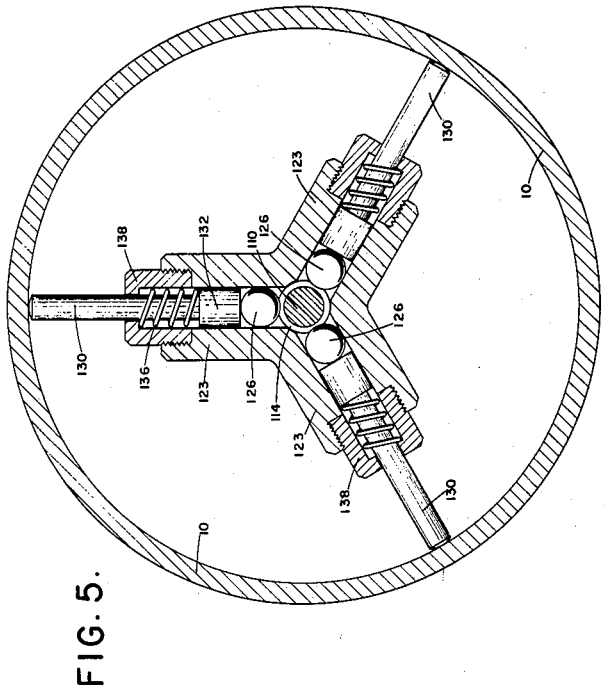
FIG. 5 is a view taken along lines 5—5 of FIG. 1.
Figure 2:
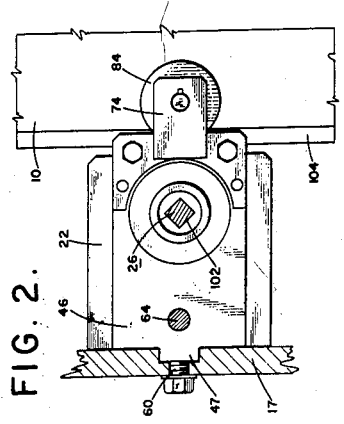
FIG. 2 is a view taken along lines 2—2 of FIG. 1.

A radial thrust ball bearing 86 is mounted in downwardly extending member 52. A second radial thrust ball bearing 88 is mounted within the inner downwardly extending portion 50. Supported for rotational movement within the bearings 86 and 88 is a sleeve 90 coaxially mounted about shaft 26. The sleeve 90 has a central portion of greater diameter 92 upon which are mounted a first cutter 94 and a second cutter 96. Cutters 94 and 96 are securely mounted to the sleeve 90 by means of a key 98 fitting in the groove 100 within sleeve 94 (see FIG. 4).

The rotatable shaft 26 is provided with an extended portion 102 of square shape. The inner periphery of the sleeve 90 is also square shaped to mate with the square-shaped extended portion 102 of shaft 26. The provision of the square-shaped mating arrangement permits the cutters to be moved longitudinally along the square-shaped portion 102 of shaft 26 when the bearing block 46 is adjusted by means of the threaded screw 64.

Cutter 94 is shaped to provide the desired cut on the edge of pipe 10. It is to be understood that though a cutter shaped to provide a square cut is shown in the figure, various other shaped cutters can be used to form any desired shape of cut. The inner cutter 96 is smaller in diameter than the outer cutter 94. Cutter 96 is shaped to provide a perfectly flat edge on the end of the smaller thickness portion 104 of the pipe 10.

A cylindrical socket 106 is bolted to the drive housing 22 by means of bolts 108 and extends downwardly from the drive housing 22. Socket 106 is substantially coaxial with the frame 12.

The above described portions of the new machine are used in combination with a cylindrical elongated mandrel 110 which is adapted to be inserted in the cylindrical socket 106. The mandrel 110 is provided with threads 112 and at least two longitudinally spaced-apart inwardly and downwardly tapering surfaces 114 and 116. For ease in machining the mandrel, a third tapered surface 118 may be provided as shown in FIG. 1.

The mandrel 110 is supported by a cylindrical mandrel support 120. Mandrel support 120 is of sufficient length to enclose both of the tapering surfaces 114 and 116. Threads 122 are provided adjacent the upper portion of mandrel support 120 and mate with the threads 112 provided on the mandrel 110.

The mandrel support 120 is provided with a first set of outwardly extending cylindrical portions 123 and a second set of outwardly extending cylindrical portions 124 spaced from the first set. Each of the outwardly extending portions 123 encloses a ball 126 adapted to ride on the tapered portion 114 of the mandrel 110. Likewise, each outwardly extending portion 124 encloses a ball 128 adapted to ride on the tapering surface 116.

An elongated centering pin 130 is mounted within the outwardly extending portions 123. The pins 130 are provided with an inner portion 132 of greater diameter to provide shoulders 134. Bias is provided against the ball 126 by means of a compression spring 136 mounted in a cylindrical spring bearing 138. Spring 136 works against the shoulder 132 to force the ball 126 against the tapered portion 114. Similarly, each of the outwardly extending portions 124 is provided with a pin 140 having a portion of greater diameter 142 abutting the ball 128. A compression spring 144 is mounted within spring bearing 146 and works against the shoulder 148 to press the ball 128 against the tapered surface 116.

In operation, the mandrel support 120 and mandrel 110 are first inserted within the pipe 10. Rotation of the mandrel support 120 in the proper direction causes the threads 122 to move upwardly with respect to the threads on mandrel 110. Thus, the balls 126 and 128 are moved outwardly against the pins 130 and 140, respectively, because of the tapered surfaces 114 and 116, respectively. The arcuately spaced-apart sets of pins center the mandrel within the pipe 10. The socket 106 is then placed over the mandrel 110 with an edge of the pipe 10 being positioned between the inner roller bearing wheel 54 and outer roller bearing wheel 76 and against the cutters 94 and 96. The outer roller bearing wheel 76 is then adjusted to engage the outside of the pipe 10. Power is then applied to the power driven rotatable shaft 36 to rotate shaft 26 and the cutters 94 and 96. The frame 12 may then be turned to form a bevel of desired shape about the outside edge of the pipe and to make the uppermost edge of the smaller thickness 104 perfectly square. This cut can be made about the entire perimeter of the pipe 10 with only one cycle of rotation of frame 12.

The herein described portable machine is particularly adapted to form bevels on sections of aluminum pipe or other pipes consisting of material having a high heat conductivity coefficient. However, it is to be understood that the machine can be used for cutting bevels in pipes of any material such as pipes made of Monel, stainless steel, copper, carbon steel, or any of the other materials commonly used in making pipe.

Normally, a great deal of heat is required to weld together sections of aluminum pipe. This machine provides a joint on each of the pipe sections to be welded together which requires much less heat than normally required. In order to do this, however, the smaller thickness 104 of each pipe section must be held to close tolerance. Also, the edge of the smaller thickness 104 must be perfectly square. If the smaller thickness of two pipe sections to be connected together are equal and their edges perfectly square, they may be welded together with much less heat than is normally required. This machine provides such a desired beveled edge.

The preferably square edge is provided by the cutter 96. Cutter 96 rides about the outer edge of the smaller thickness 104 and cuts off any edges which may be present thereon.

The inside and outside of a preformed pipe should be perfectly round. However, it often occurs that the inside and outside perimeters of the pipe has out-of-roundness sections. The construction of this new machine provides for such a situation. The construction of bearing block 46 and the outwardly extending roller bearing wheel support 74 is such that a slight elasticity is present therein. This means that any out of roundness of the pipe 10 causes the portion 74 to pivot ever so slightly. However, notice that the position of the cutters 94 and 96 with respect to the inner roller bearing wheel 58 is always held constant. Hence, since roller bearing wheel 58 rides on the inside surface of the pipe 10, the thickness of the smaller thickness portion 104 will remain constant as the frame 12 is turned to form the desired cut.

The embodiment shown in FIGS. 7 through 10 may be used with any size pipe similarly to FIGS. 1 through 6. However, the embodiment of FIGS. 7 through 10 is particularly useful in forming bevels on thick pipe having a small inside diameter. In describing this embodiment, like parts to the embodiment of FIGS. 1 through 6 will be referred to by like numerals.

Figure 7:
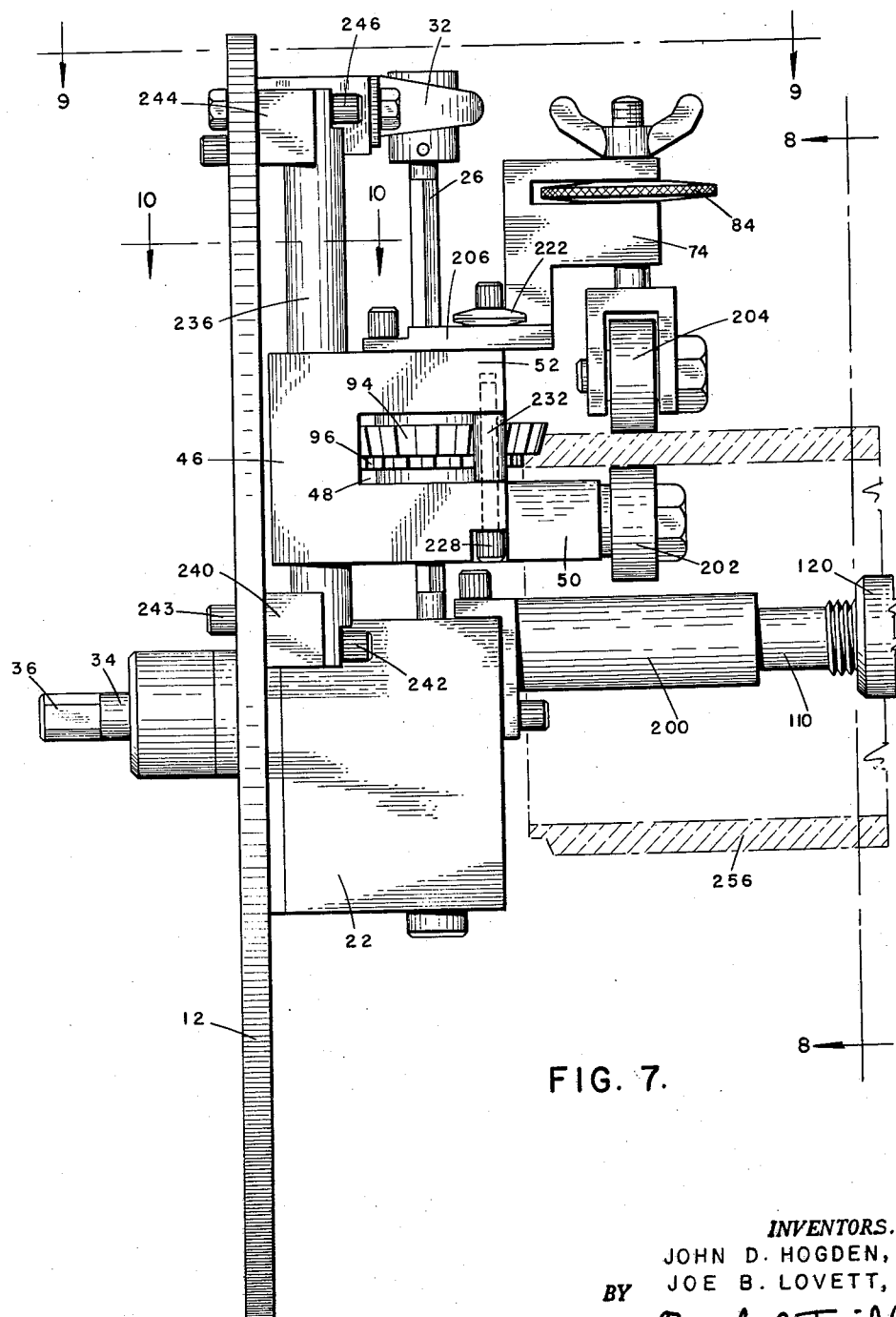
FIG. 7 is an elevational view of a second embodiment showing the machine and its component parts in position to form the bevel on the edge of a pipe.

Referring specifically to FIG. 7, it is seen that the socket 200 connected to the drive housing 22 is along the axis of the frame 12. However, the drive housing 22 and the shaft 34 is offset from the axis of the frame 12. This offset arrangement permits the bearing block 46 to be moved inwardly closer to the axis of the shaft 34 than possible with the embodiment of FIGS. 1 through 6. This arrangement also permits larger roller bearings to be used. Thus, bearings 202 and 204 of FIG. 7 are larger than bearings 54 and 76 of FIG. 1. These larger bearings are necessary when the machine is used to bevel the edges of very thick pipe.

When cutting thick pipe, a greater deflection of the outer roller bearing wheel support 74 is usually required to provide for variations in roundness of the inside perimeter and outside perimeter of the pipe. Accordingly, in this embodiment, the bearing wheel support 74 does not form an integral part of the downwardly extending portion 52 of the bearing block 46. Rather, bearing wheel support 74 is connected to the outside of the downwardly extending portion 52 by means of a flat member 206. Member 206 extends downwardly from the outer side of bearing block 46 to a point below the lower extremity of the downwardly extending portion 52. As seen more clearly in FIG. 9, member 206 is constructed to have a flat bottom 208, and two upwardly and outwardly extending sides 210 and 211 to form a substantially U-shaped frame 212 through which shaft 26 extends. Sides 210 and 211 of flat member 206 are connected to the bear-block 46 by means of bolts 214 and 215, respectively.

To provide for deflection of the member 206, four halfshell or plate-shaped springs are employed. Plate-shaped springs 216 and 218 face one another and are connected by means of bolt 220 in a manner such that they resiliently exert a bias against the plate member 206. Similarly, spring members 222 and 224 are mounted by means of bolt 226 to exert a resilient bias against the other side of plate 206. This spring action keeps the inside roller 202 in contact with the pipe at all times.

Bolts 228 and 230 extend through portions 50 and 52 of bearing block 46 and spacers 232 and 234 are arranged about bolts 228 and 230 and in slot 48 to prevent any inward or outward movement of the downwardly extending legs 50 and 52 of the bearing block 46 with respect to one another.

Figure 10:
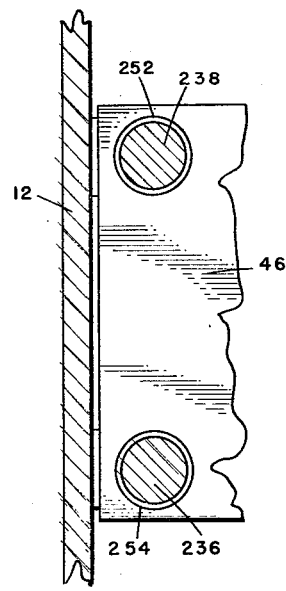
FIG. 10 is a view taken along lines 10—10 of FIG. 7.
Figure 8:
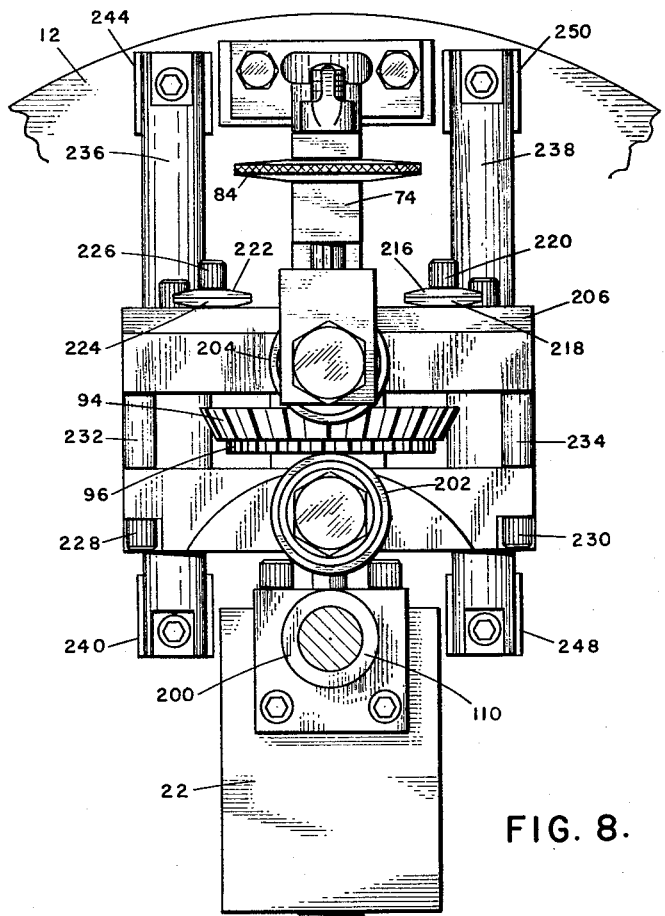
FIG. 8 is a view taken along lines 8—8 of FIG. 7.
Figure 9:
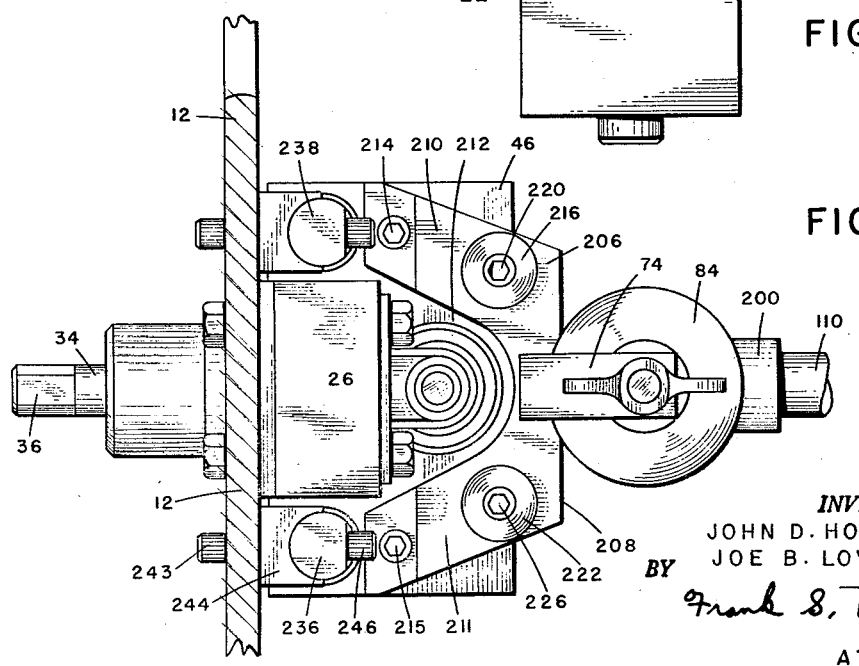
FIG. 9 is a view taken along lines 9—9 of FIG. 7.

Instead of being mounted directly to the frame 12, the bearing block 46 of FIG. 7 is mounted for slidable movement upon a pair of guide rods 236 and 238. Guide rod 236 is generally cylindrical in shape with its inner end mounted to an inner rod support 240 by means of bolt 242. Inner rod support 240 is bolted to the frame 12 by bolt 243. The outer end of guide rod 236 is supported by an outer rod support 244 and connected to rod support 244 by means of bolts 246. Rod support 244 is bolted to frame 12. Similarly, guide rod 238 is supported by inner rod support 248 and outer rod support 250, both being connected to the frame 12 (see FIG. 8). As shown in FIG. 10, a bushing 252 and a bushing 254 are mounted about rods 236 and 238, respectively, in the openings formed in the block 46 to receive the guide rods 236 and 238.

The manner of operating the embodiment shown in FIGS. 7 through 10, inclusive, is similar to the operation of the embodiment shown in FIGS. 1 through 6, inclusive. In order to center the thick pipe 256, the same mandrel is used having the same structure as that disclosed in FIG. 1. The mandrel support and mandrel are first inserted within the pipe. Rotation of the mandrel support causes the balls to be moved outwardly and the pins center the mandrel within the pipe. The socket 200 is then placed over the mandrel. Bearing block 46 automatically adjusts its position radially to properly position inner roller bearing 202 against the inside of the pipe 256. The outer roller bearing 204 is then placed against the outside of the pipe. Power is then applied to the power driven rotatable shaft 34 to rotate shaft 26 and the cutters 94 and 96. The frame is then turned to form the bevel of the desired shape about the outside edge of the pipe and to make the uppermost edge of the smaller thickness 258 perfectly square. This cut is made about the entire perimeter of the pipe with only one cycle of rotation of frame 12.

We claim:

1. A machine for cutting bevels on the extremities of metal pipe comprising: a frame; a housing mounted on the frame and extending below the frame; a rotatable shaft having one end mounted in the housing and extending outwardly from the housing in a plane parallel to the frame; motor operated means for rotating said rotatable shaft; a radially adjustable bearing block extending from the frame and having a slot extending upwardly from the bottom thereof to form an inner downwardly extending member and an outer downwardly extending member; an inner roller bearing wheel connected to the inner downwardly extending member; an adjustable outer roller bearing wheel connected to the outer downwardly extending member; a sleeve mounted about the rotatable shaft; and at least one cutter mounted on the sleeve and located within the slot formed in the adjustable bearing block whereby the cutter can be placed on the edge of the pipe with the inner roller bearing in contact with the inside of the pipe, the adjustable outer roller bearing wheel placed against the outside of the pipe, the shaft rotated to cause the cutter to cut the pipe, and the frame turned to form the bevel.

2. A machine in accordance with claim 1 wherein there are two cutters adjacently mounted on the sleeve, with the inner cutter being of shorter radius than the other.

3. A machine in accordance with claim 2 wherein a portion of the rotatable shaft is square shaped and the inner periphery of the sleeve is shaped to mate with said portion of the shaft thereby permitting slidable movement of the sleeve along the shaft.

4. A machine for cutting bevels on the extremities of metal pipe comprising: a frame; a housing mounted on the frame and extending below the frame; a rotatable shaft having one end mounted in the housing and extending outwardly from the housing in a plane parallel to the frame; at least one rod supported below the frame and in a horizontal plane above the rotatable shaft; a bearing block mounted for slidable movement on the rod and having a slot extending upwardly from the bottom thereof to form an inner downwardly extending member and an outer downwardly extending member; an inner roller bearing wheel connected to the inner downwardly extending member; an adjustable outer roller bearing wheel connected to the outer downwardly extending member; a sleeve mounted about the rotatable shaft; and at least one cutter mounted on the sleeve and located within the slot formed in the bearing block whereby the cutter can be placed on the edge of the pipe with the inner roller bearing in contact with the inside of the pipe, the adjustable outer roller bearing wheel placed against the outside of the pipe, the shaft rotated to cause the cutter to cut the pipe, and the frame turned to form the bevel.

5. A machine in accordance with claim 4 wherein the adjustable outer roller bearing wheel is connected to the outer downwardly extending member by a flat member extending downwardly from the outer edge of the downwardly extending member and spring members are mounted to resiliently bear against the outside of said flat member.

6. A portable machine for cutting bevels on the extremities of metal pipe comprising in combination: a frame; a pillar block bearing extending downwardly from an edge of the frame; a shaft bearing mounted in the lower portion of the pillar block bearing; a power driven rotatable shaft centrally mounted to the frame and extending through the frame; a second rotatable shaft extending in a direction perpendicularly from the power driven rotatable shaft with its outer end mounted in said shaft bearing, said second rotatable shaft having an extended square-shaped portion; a drive housing connected to the frame; a gear assembly within the drive housing and operatively interconnecting the power driven shaft and the second rotatable shaft; a radially adjustable bearing block extending downwardly from the frame, said adjustable bearing block having a slot extending upwardly from the bottom thereof to form an inner downwardly extending member and an outer downwardly extending member; an inner roller bearing wheel connected to the lower extremity of the inner downwardly extending member; an outer roller bearing wheel support extending outwardly from the lower extremity of the outer downwardly extending member; an adjustable outer roller bearing wheel mounted within the outer roller bearing wheel support; a radial thrust bearing mounted in each of said inner and outer downwardly extending members; a sleeve mounted in said radial thrust bearings and having an inner square-shaped periphery to conform with the square-shaped portion of said second rotatable shaft; an outer cutter mounted on said sleeve and of proper shape to form the desired shape of cut; and an inner smaller cutter mounted on said sleeve and adjacent to the outer cutter and shaped to form a flat edge on the pipe whereby the pipe can be placed between the inner and outer roller bearing wheels and against the cutters, the outer roller bearing wheel adjusted to engage the outside of the pipe, and power applied to the power driven rotatable shaft to revolve the cutters and form a cut of desired shape about the outside and edge of the pipe.

References Cited in the file of this patent

UNITED STATES PATENTS

| | | |
|---|---|---|
| 2,185,382 | Newton | Jan. 2, 1940 |
| 2,364,506 | Berezny | Dec. 5, 1944 |
| 2,616,462 | Haddican | Nov. 4, 1952 |
| 2,543,945 | Taylor | Mar. 6, 1951 |
| 2,625,860 | Plester | Jan. 20, 1953 |
| 2,630,039 | Klemm | Mar. 3, 1953 |
| 2,793,553 | Mathews | May 28, 1957 |
| 2,837,973 | Dunlap | June 10, 1958 |
| 2,917,976 | Stovall et al. | Dec. 22, 1959 |

FOREIGN PATENTS

| | | |
|---|---|---|
| 213,313 | Australia | Dec. 23, 1957 |
| 675,973 | Germany | May 22, 1939 |
| 715,780 | Germany | Jan. 7, 1942 |